(12) United States Patent
Lukac et al.

(10) Patent No.: US 7,281,975 B2
(45) Date of Patent: Oct. 16, 2007

(54) QUICK-ADJUST COTTON PICKER BASKET

(75) Inventors: John Bradley Lukac, Chicago, IL (US); Gary A. Zinser, Jr., Davenport, IA (US); Jesse H. Orsborn, Birdsboro, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/220,423

(22) Filed: Sep. 7, 2005

(65) Prior Publication Data

US 2007/0054713 A1    Mar. 8, 2007

(51) Int. Cl.
A01F 12/60    (2006.01)

(52) U.S. Cl. .................. 460/119; 414/505

(58) Field of Classification Search ........... 56/16.6, 56/28, 344; 460/23, 119, 150; 160/23, 119, 160/150; 100/145, 337; 414/525.2, 526, 414/489, 491, 505
See application file for complete search history.

(56) References Cited

U.S. PATENT DOCUMENTS

| | | | |
|---|---|---|---|
| 3,412,532 A | 11/1968 | Nickla | |
| 3,552,105 A * | 1/1971 | Graham | 56/13.5 |
| 3,602,404 A | 8/1971 | Frank | |
| 3,965,660 A * | 6/1976 | Kanengieter et al. | 56/344 |
| 3,991,544 A * | 11/1976 | Allwood | 56/344 |
| 4,106,649 A | 8/1978 | Nelson et al. | |
| 4,341,423 A * | 7/1982 | Fachini et al. | 298/18 |
| 4,414,794 A | 11/1983 | Riedinger | |
| 4,519,189 A | 5/1985 | Fachini et al. | |
| 4,744,207 A * | 5/1988 | Hanley et al. | 56/16.6 |
| 4,930,297 A * | 6/1990 | Schlueter et al. | 56/16.6 |
| 4,996,831 A | 3/1991 | Pearson et al. | |
| 5,151,064 A | 9/1992 | Damman et al. | |
| 5,407,390 A | 4/1995 | Carney et al. | |
| 5,427,572 A | 6/1995 | Deutsch et al. | |
| 5,556,237 A | 9/1996 | Rexius | |
| 5,601,486 A | 2/1997 | Schlueter | |
| 6,263,651 B1 * | 7/2001 | Schaeffer et al. | 56/30 |
| 6,508,705 B1 | 1/2003 | Van Overschelde | |
| 6,752,715 B2 | 6/2004 | Stephens et al. | |
| 6,881,022 B2 | 4/2005 | Feller | |
| 2003/0232634 A1 | 12/2003 | Johnson et al. | |
| 2005/0229570 A1 * | 10/2005 | Orsborn et al. | 56/30 |

FOREIGN PATENT DOCUMENTS

WO    WO 93/00794    1/1993

* cited by examiner

Primary Examiner—Thomas A. Beach
Assistant Examiner—Alicia Torres
(74) Attorney, Agent, or Firm—Michael G. Harms; John William Stader; Patrick M. Sheldrake (57) ABSTRACT

A cotton picker basket is disclosed that includes a first basket portion and a second basket portion, the first basket portion configured to move relative to the second basket portion to adjust a volume contained therein and an compactor disposed at least in part within one of the first basket portion and the second basket portion. The cotton picker basket also includes an actuator configured to adjust a position of the compactor within one of the first basket portion and the second basket portion and to move the first basket portion relative to the second basket portion to adjust the volume contained therebetween.

12 Claims, 6 Drawing Sheets

QUICK-ADJUST COTTON PICKER BASKET

CROSS-REFERENCE TO RELATED APPLICATION

Not applicable.

STATEMENT REGARDING FEDERALLY SPONSORED RESEARCH OR DEVELOPMENT

Not applicable.

BACKGROUND OF THE INVENTION

The present invention relates generally to agricultural systems and, more particularly, to a system and method for a quick-adjust cotton picker basket.

Agricultural vehicles such as tractors and combines are mainstays within the agricultural industry. One common agricultural vehicle is a harvester. Harvesters and, in particular, cotton pickers, typically include bins or baskets that hold the harvested crop as the harvester traverses the field.

On the other hand, it is advantageous that theses baskets be as large as possible to allow the operator to reap as much of the harvest as possible without being required to empty the basket. On the other hand, basket size must not reach heights that would interfere with power and communications lines when traveling between fields or make extended road travel difficult. As such, modern harvesters typically include baskets that expand to a maximum size for harvesting operations and then retract for travel between fields or extended travel over roads. In particular, these traditional telescoping baskets employ three separate height adjustments. First, the baskets have a minimum or lowered position that is required so that the baskets can be reduced to a size appropriate for being trucked or transported for extended periods. Second, the baskets have a maximum or raised operational position that creates a maximum volume for harvest storage. Third, since the raised position generally extends to heights that would interfere with power or communications lines during inter-field travel and adjusting the basket from the raised position to the lowered position is quite burdensome, traditional baskets typically have an intermediate position that is appropriate for short travel between fields but does not require the full extent of hardware reconfigurations necessary to switch the basket from the raised position to the lowered position.

For example, some harvesters, when the basket is in the raised position, have an overall height nearing 200 inches. In this case, it is necessary to reduce the overall height to approximately 160 inches to travel between fields and about 150 inches for trucking or extended transportations.

While employing an intermediate position for field travel reduces the burden of adjusting the basket between the full raised and full lowered positions, adjusting traditional telescoping basket systems between the intermediate and raised positions is still quite laborious and time consuming. That is, extensive preparation must be undertaken by the operator to raise and lower the basket. In particular, the operator must connect or disconnect/remove air chutes and other associated hardware from the basket. Then, the operator must use mechanical stands positioned over the basket lift cylinders to move an upper portion of the basket into or out of the lower portion of the basket to adjust between the raised, intermediate, and lowered positions. The burden of performing this process is further compounded by the need to repeatedly adjust the basket between the raised and intermediate positions when merely traveling between fields.

BRIEF SUMMARY OF THE INVENTION

The present invention overcomes the aforementioned drawbacks by providing a quick-adjust cotton picker basket. In particular, the cotton picker basket can be quickly adjusted between a raised position and a lowered position without requiring an operator to make substantial hardware reconfigurations. Furthermore, the cotton picker basket has a raised position that is suitable for both harvesting and inter-field travel.

In accordance with one aspect of the invention, a cotton picker basket is disclosed that includes a first basket portion and a second basket portion, the first basket portion configured to move relative to the second basket portion to adjust a volume contained therein and an compactor disposed at least in part within one of the first basket portion and the second basket portion. The cotton picker basket also includes an actuator configured to adjust a position of the compactor within one of the first basket portion and the second basket portion and to move the first basket portion relative to the second basket portion to adjust the volume contained therebetween.

The basket may further include a pivot configured to support a first end of the compactor and a first end of the first basket portion to permit pivotal motion of the first basket relative to the second basket and pivotal motion of the compactor within at least one of the first basket portion and the second basket portion.

Furthermore, the first basket portion may include an entry portal at a second end of the first basket portion and the entry portal may be configured to receive cotton entering the basket.

Additionally, the actuator may be configured to move the first basket portion between a raised position for harvesting operations and inter-field travel and a lowered position for extended transportation.

The basket may further include a stop configured to support the first basket portion against the second basket portion when in the lowered position.

The basket may also include a hood configured to cover at least a portion of the first basket portion when in the lowered position.

Also, the basket may include a latch assembly configured to support the first basket portion when in the raised position.

The basket may further include a switch configured to initiate movement of the first basket portion between the lowered position and the raised position.

The basket may also include at least one support member extending from the compactor to the second basket portion to support one end of the compactor thereagainst.

Furthermore, the compactor may be configured to pivot between a lowered position to engage the at least one support member against the second basket portion and a raised position near the first basket portion when the first basket portion is in the raised position.

Additionally, the at least one support member may be configured to be arranged in a harvesting position when the compactor is raised position within the first basket portion.

In accordance with another aspect of the invention, a cotton picker basket is disclosed that includes a lower basket portion having a first volume therein and an upper basket portion having a second volume therein. The cotton picker basket also includes a pivot at least partially supporting at least one of the lower basket portion and the upper basket portion to allow pivotal motion of at least one of the lower basket portion and the upper basket portion between an extended travel position where the first volume and the second volume occupy a common volume and a harvesting position where the first volume is substantially disjunctive from the second volume and an actuator disposed at least in part in at least one of the lower basket portion and the upper basket portion and configured to move at least one of the lower basket portion and the upper basket portion between the extended travel position and the harvesting position.

The basket may also include an compactor to compact cotton entering the basket.

As such, the compactor may be at least in part supported by the pivot to allow pivotal motion of the compactor between an extended travel position and a harvesting position.

Additionally, the actuator may be at least in part supported by the compactor to move at least one of the lower basket portion and the upper basket portion between the extended travel position and the harvesting position.

Furthermore, the actuator may be at least in part supported by a stand configured to engage a base of the lower basket portion to support the actuator when moving at least one of the lower basket portion and the upper basket portion between the extended travel position and the harvesting position.

The basket may further include a hood rotatably mounted to the upper basket portion to move between a stowed position extending over at least a portion of the upper basket portion when in the extended travel position and an operational position extending from the upper basket portion when in the harvesting position to receive cotton deliver to the basket.

In accordance with yet another aspect of the invention, a method of manufacturing a cotton picker basket is disclosed that includes positioning a lower basket portion below an upper basket portion, each of the upper basket portion and lower basket portion having a volume for receiving cotton therein and connecting the upper basket portion through a pivot to the lower basket portion to allow the upper basket portion to move between a raised position and a lowered position. The method also includes supporting a first end of a compactor within at least one of the volumes on a pivot to allow pivotal motion of the compactor between a lowered position and a raised position and connecting at least one actuator between the upper basket portion and the compactor to move the upper basket portion between the lowered position and the raised position and to move the compactor between the lowered position and the raised position.

The method may also include connecting a latch to at least one of the upper basket portion and the lower basket portion to secure the upper basket portion in the raised position.

Additionally, the method may include supporting a second end of the compactor with at least one support member configured to engage the lower basket portion when the compactor is in the lowered position.

Various other features of the present invention will be made apparent from the following detailed description and the drawings.

BRIEF DESCRIPTION OF THE DRAWINGS

Reference is hereby made to the following drawings in which like reference numerals correspond to like elements throughout, and in which.

DETAILED DESCRIPTION

Figure 1:
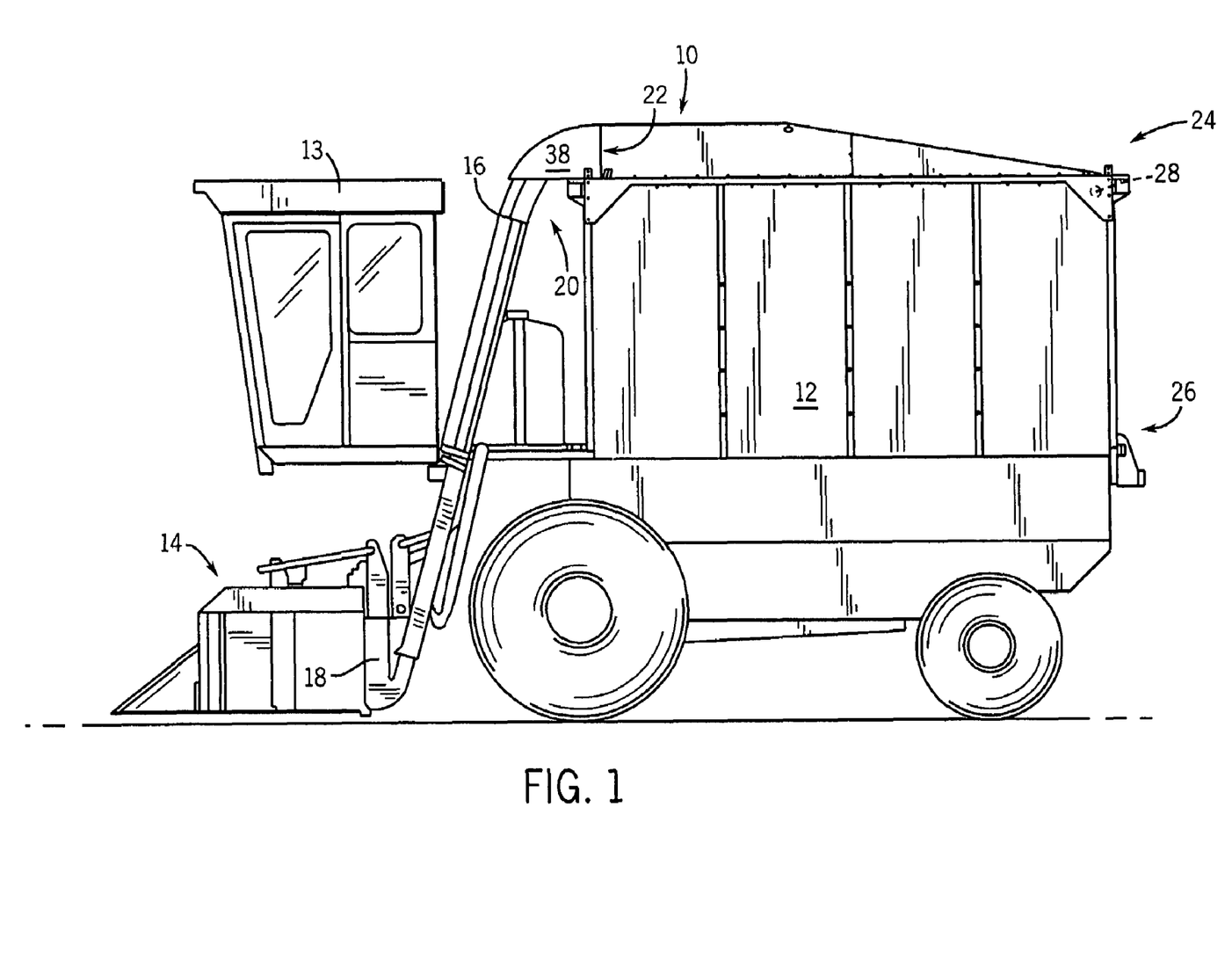
FIG. 1 is a side elevation view of a cotton picking machine incorporating a quick-adjust cotton picking basket system in accordance with the present invention.

Referring to FIG. 1, a cotton picking machine 10 is shown incorporating a quick-adjust cotton picker basket 12 in accordance with the present invention. Specifically, cotton picking machine 10 as shown, includes an operator deck 13 and a harvesting head 14 that extends forwardly beyond operator deck 13 to remove cotton from plants and transfer the removed cotton via an air chute 16 to cotton picker basket 12. Air chute 16 includes a first end 18 configured to receive picked cotton from harvesting head 14 and a second end 20 adjacent to an entry portal 22 of basket 12 to deliver the cotton to through entry portal 22 into an upper portion 24 of basket 12. More particularly, second end 20 of air chute 16 extends only far enough to reach a hood 38. That is, second end 20 of air chute 16, as shown, nearly reaches hood 38 such that cotton moving through air chute 16 is expelled at second end 20 and guided by hood 38 into entry portal 22. In accordance with one embodiment, a fan (not shown) blows the removed cotton through air chute 16 and into basket 12 through entry portal 22. Accordingly, second end 20 may, as shown, extend beyond a lower edge of hood 38. Alternatively, second end 20 may terminate substantially even with the lower edge of hood 38 or slightly below the lower edge of hood 38.

Upper portion 24 of basket 12 is pivotally movable with respect to a lower portion 26 of basket 12 via a pivot 28. Specifically, upper portion 24 is configured to pivot between a raised or extended position and a lowered or retracted position. As will be described, upper portion 24 is shown in FIG. 1 in a raised position with respect to lower portion 26 that is suitable for both harvesting operations and inter-field travel. That is, due to the low profile of basket 12 with respect to operator deck 13, the overall height of cotton picking machine 10 when upper portion 24 is in the raised position is suitable for both harvesting and/or inter-field travel.

Still referring to FIG. 1, due to the streamlined design of basket 12, the overall height of cotton picking machine 10 is reduced such that only two adjustable heights are necessary. That is, upper portion 24 of basket 12 has a streamlined contour such that upper portion 24 does not extend substantially above operator deck 13 and slopes downward therefrom toward pivot 28. Accordingly, unlike squared telescoping baskets, basket 12 has only a raised and a lowered position and no intermediate or dedicated field travel position necessary because, due to the contoured design, the raised operational position is at a height traditionally considered appropriate for inter-field transfer. As such, the raised operational position is also the inter-field transfer position. Therefore, the burden of adjusting a basket between the raised and intermediate positions is removed. That is, when traversing between fields, an operator can remain in operator deck 13 because no adjustments to basket 12 are necessary to clear power or communications lines or the like.

Figure 2:
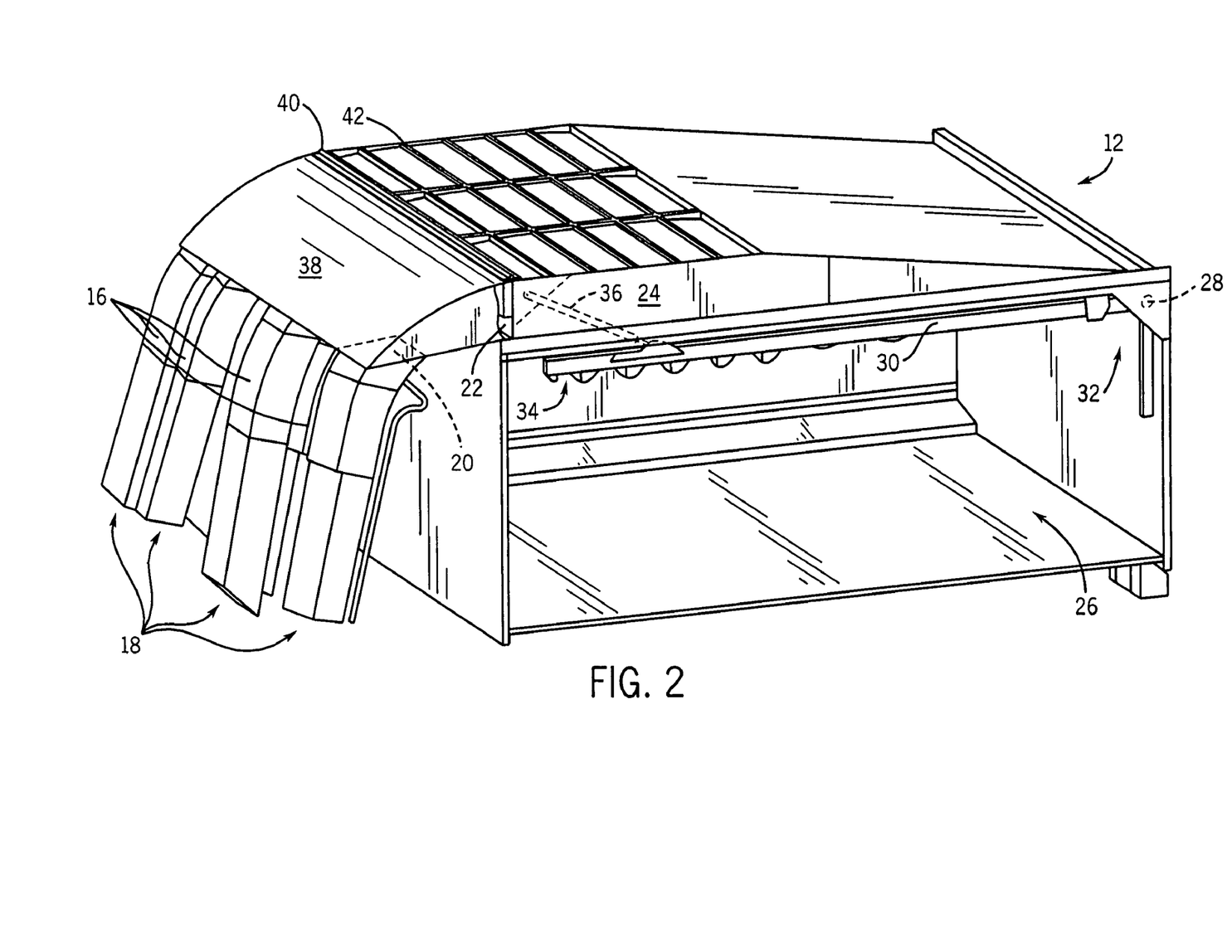
FIG. 2 is a detailed perspective view of the quick-adjust cotton picking basket system in accordance with the present invention.

Additionally, as will be described with respect to FIGS. 2-6, upper portion 24 is configured to quickly adjust from the raised position shown in FIG. 1 to a lowered position appropriate for extensive travel or trucking with minimal operator burden. Referring now to FIG. 2, cotton picker basket 12 is again shown with upper portion 24 raised in an extended position above lower portion 26. In the illustrated embodiment, a door (not shown) of basket 12 has been removed to show the interior of basket 12. An compactor or conveyer 30 is disposed within basket 12 and is supported at a first end 32 substantially opposite entry portal 22 by pivot 28. As shown, the compactor may be an auger, however, various compactor devices or systems may be equivalently employed with the present invention. Accordingly, compactor 30 is adjustable about pivot 28 to raise and lower a second end 34 of compactor 30. To facilitate the raising and lowering of the compactor 30 about pivot 28, a plurality of extension members 36 that function as an actuator are included. In accordance with one embodiment, extension members 36 are hydraulic cylinders configured to facilitate raising and lowering of both compactor 30 and upper portion 24. That is, extension members 36 are connected between second end 34 of compactor 30 and upper portion 24 of basket 12. Accordingly, as will be described in detail with respect to FIGS. 3-6, by pivotally supporting both upper portion 24 and compactor 30 on pivot 28 and connecting extension members 36 therebetween, extension members 36 are configured to raise and lower both upper portion 24 and compactor 30 between a raised or operational position (FIG. 2) and a retracted or extended travel position (FIG. 3).

Additionally, hood 38 is rotatable about a hinge 40 to extend over second end 20 of air chutes 16 when basket 12 is in the operational position, as shown. Furthermore, hood 38 may be rotated back over a plurality of grates 42 when basket 12 is in the lowered/extended travel position, as shown in FIG. 3. As shown in FIG. 2, grates 42 may be arranged in upper portion 24 in five rows. However, it is contemplated that the specific number of rows of grates 42 can be increased or decreased to meet the cost and operational parameters desired.

Referring now to FIGS. 3-6, the progression of steps taken by basket 12 when adjusting from the lowered position (FIG. 3) to the raised position (FIG. 6) is shown. First, referring to FIG. 3, basket 12 is shown with upper portion 24 in the lowered travel position. In the lowered position, a first end 44 of upper portion 24 has been pivoted about pivot 28 to extend a second end 46 into lower portion 26. As previously stated, upper portion 24 has a streamlined contour that eliminates the need for a dedicated intermediate inter-field travel position. Additionally, due to the fact that second end 46 is angled with respect to first end 44 at a break point 48, first end 44 is substantially flush with an upper end 50 of lower portion 26 while second end 46 slopes down into lower portion 26. Accordingly, hood 38 rotates back to rest upon upper portion 24 to cover at least a portion of grates 42, shown in FIG. 2. In this regard, at least a portion and, preferably, a majority of hood 38 is recessed below upper end 50 of lower portion 26.

Figure 3:
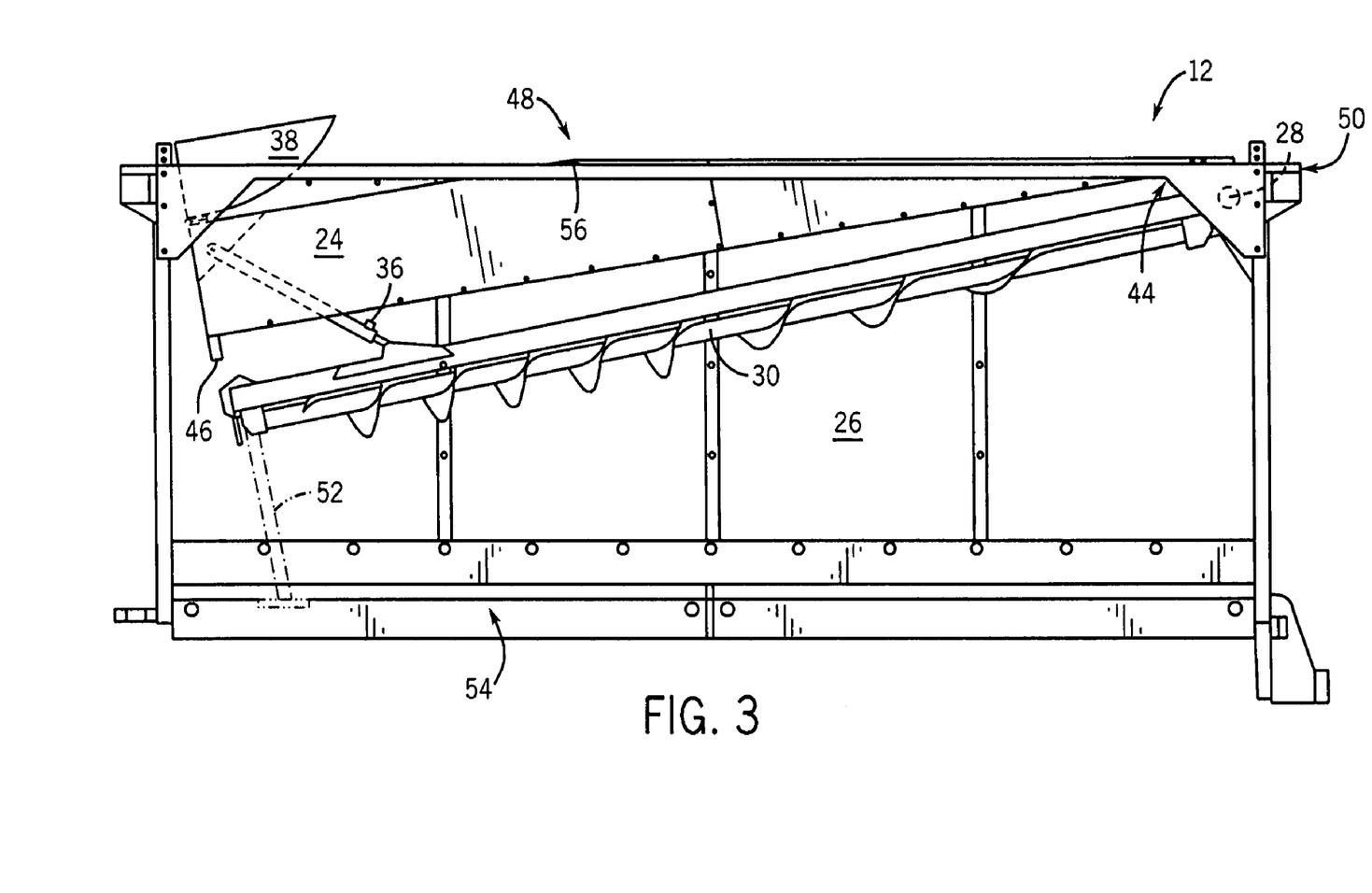
FIG. 3 is a side elevational view of the quick-adjust cotton picking basket system of FIG. 2 shown in a lowered, extended travel position.

Still referring to FIG. 3, at least one support member 52 extends from compactor 30 to a floor 54 of lower portion 26. Support member 52 is shown in phantom within FIG. 3 to show that the illustrated positioning of support member 52 is optional when in the lowered/extended travel position shown in FIG. 3. In particular, support member 52 may be pivotal about one of two pivot points so that support member 52 may be stowed when not in use. That is, it is contemplated that support member 52 may pivotally engage compactor 30, in which case, support member 52 is rotatable away from floor 54 of lower portion 26 to be stowed against compactor 30. Alternatively, support member 52 may pivotally engage floor 54 of lower portion 26, in which case, support member 52 is rotatable away from compactor 30 to be stowed against floor 54. Furthermore, it is contemplated that support member 52 may be configured to disengage both floor 54 and compactor 30 so that an operator can remove support member 52 when not in use.

In any case, when upper portion 24 is lowered into lower portion 26, as shown in FIG. 3, depending upon the configuration of basket 12, support member 52 may or may not be engaged between compactor 30 and floor 54. That is, according to one embodiment, upper portion 24 includes a stop 56 extending from break point 48 to engage upper end 50 of lower portion 26. In this case, upper portion 24 is supported by upper end 50 of lower portion 26 and in turn can support compactor 30 through extension members 36. As such, support members 52 may be stowed or removed when basket 12 is in the lowered position. Alternatively, upper portion 24 may not include stop 56 and, thus, when basket 12 is in the lowered position shown in FIG. 3, support members 52 will engage floor 54 to support compactor 30 and upper portion 24 through extension members 36.

Figure 4:
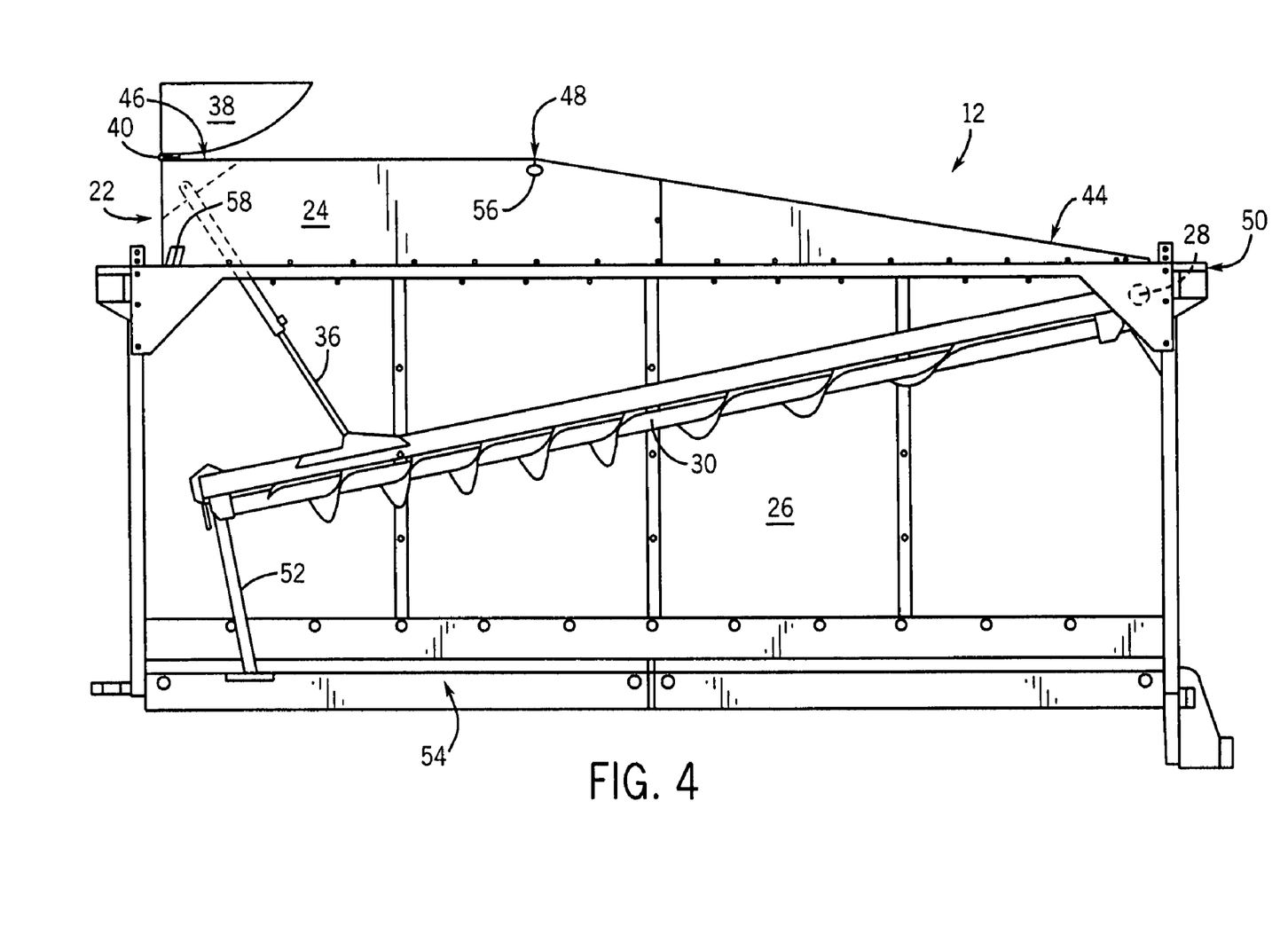
FIG. 4 is a side elevational view of the quick-adjust cotton picking basket system of FIGS. 2-3 shown in a first-stage of elevation.

Referring now to FIG. 4, basket 12 is shown with the upper portion 24 raised into the raised operational/inter-field travel position. That is, extension members 36 are extended to push against compactor 30 and, in turn, against floor 54 through support member 52. As such, extension members 36 have moved upper portion 24 from the retracted position shown in FIG. 3 to the extended position shown in FIG. 4. In this regard, the burden of raising upper portion 24 is performed by extension members 36 rather than by an operator through positing mechanical stands over the basket lift cylinders to move upper portion 24 of basket 12 into or out of the lower portion 26 of basket 12. As previously addressed, according to one embodiment, extension members 36 are hydraulic cylinders that actuate to raise upper portion 24 more rapidly than traditional systems that require the operator to use mechanical stands.

Continuing with respect to FIG. 4, a quick latch system is included to secure upper portion 24 in the extended position. For example, quick latches 58 may be positioned to engage upper end 50 of lower portion 26 to hold upper portion 24 in the raised operational/inter-field position. While shown in FIG. 4 as a latch that is extendable from second end 46 of upper portion 24 to engage upper end 50 of lower portion 26, it is contemplated that the quick latches 58 may be positioned in any of a variety of positions about upper portion 24 or may extend from lower portion 26 to engage upper portion 24.

Figure 5:
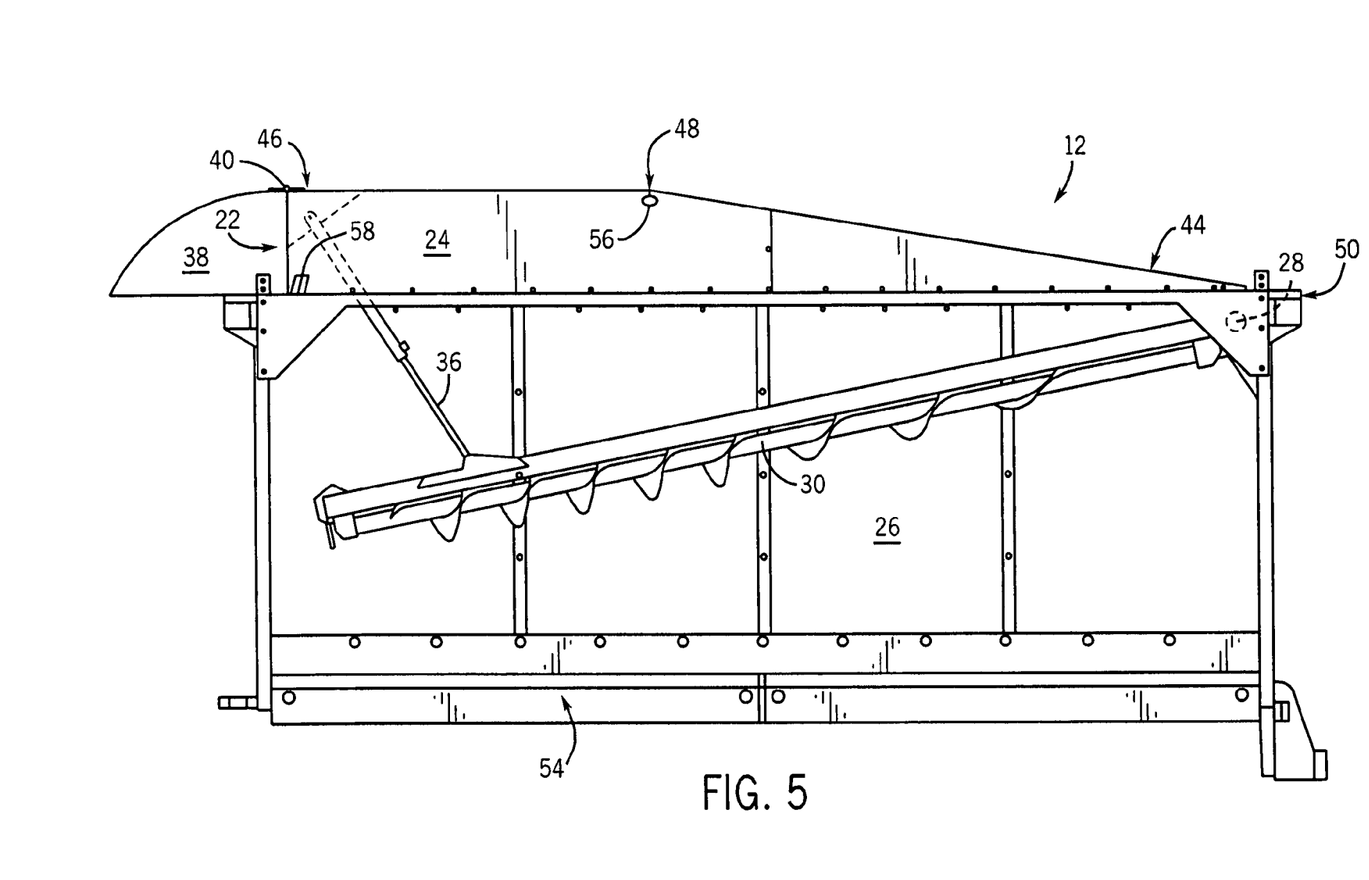
FIG. 5 is a side elevational view of the quick-adjust cotton picking basket system of FIGS. 2-4 shown in a second-stage of elevation.
Figure 6:
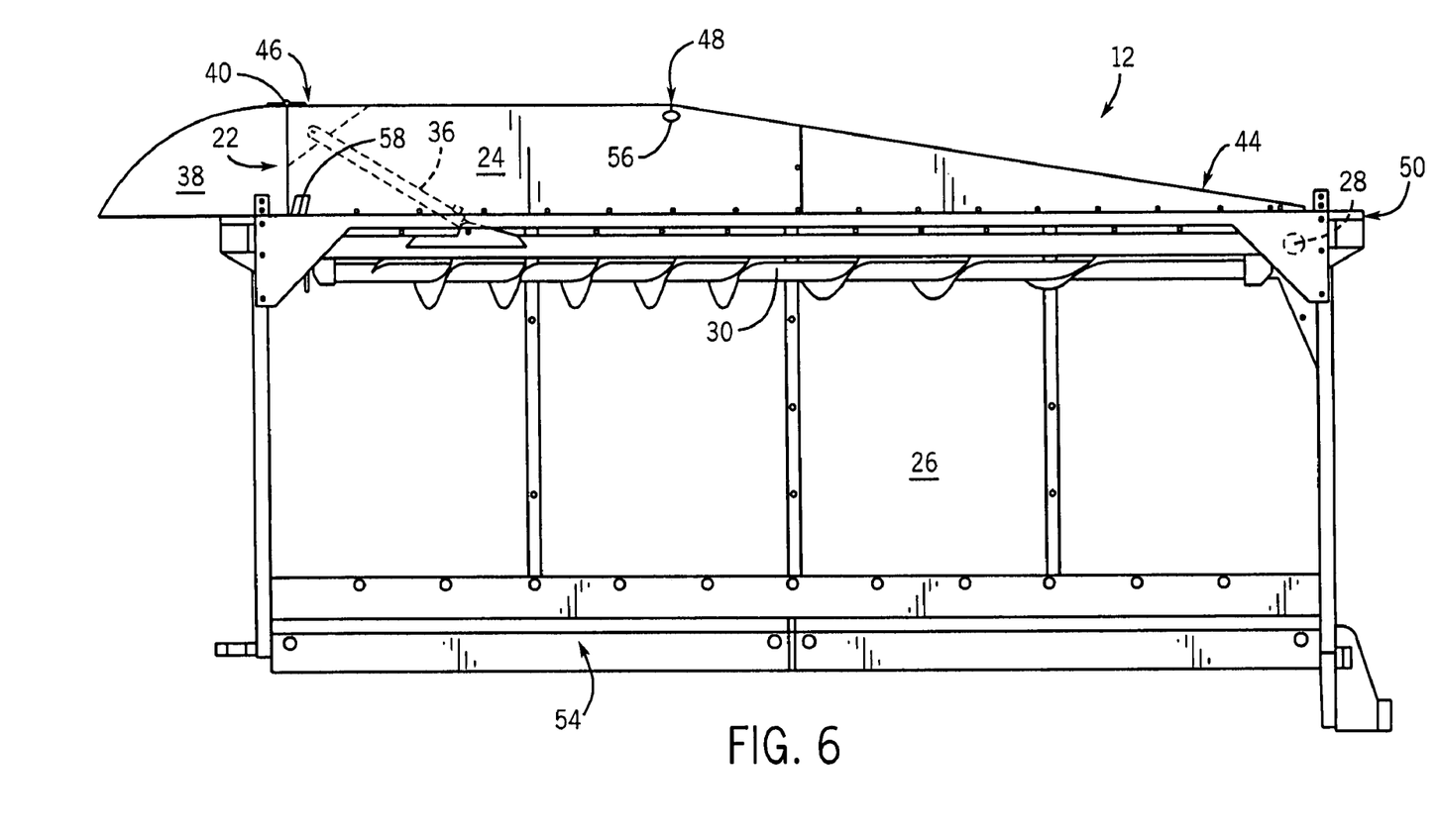
FIG. 6 is a side elevational view of the quick-adjust cotton picking basket system of FIGS. 2-5 shown in an raised, operational and inter-field travel position.

As shown in FIG. 5, once the quick latches 58 are engaged, hood 38 may be rotated forward and support members 52 of FIGS. 3 and 4, may be arranged in harvesting position (i.e. stowed or removed). That is, once quick latches 58 are engaged, upper portion 24 is supported by lower portion 26. As such, when support members 52 of FIG. 4 are removed, compactor 30 is supported through extension members 36 by upper portion 24. Accordingly, extension members 36 can be used to raise compactor 30 from the lowered position shown in FIGS. 3-5 to an operational position, as shown in FIG. 6. Once compactor 30 is elevated from the extended travel position toward upper portion 24 and into a compacting/harvesting position, basket 12 is prepared for operation.

To actuate the above-described quick adjust system, a switch, such as a tether switch (not shown), may be included. It is contemplated that the tether switch may be positioned such that the operator is required to be positioned away from the components of the quick adjust system to engage the switch. In this regard, the system will, with minimal operator intervention, adjust between the lower and raised positions.

It should be recognized that the above-described process that quickly and with little burden upon the operator adjusts from a lowered or extended trucking or travel position to the raised or operational/inter-field transport position can also be reversed to adjust the basket from the raised to the lowered position. That is, by reversing the above-described process, the basket can be quickly adjusted from the raised to the lowered position with little burden upon the operator.

Therefore, the present invention provides a quick raise/lower system that has an operating height that is the same as traditional field transfer heights. As such, no reconfiguration such as folding down of air chutes is required to travel between fields. In fact, the operator is not required to raise or lower the basket when traversing between fields. Additionally, the quick adjust system includes a pivot located at the rear of the basket and designed to be shared by the upper portion and the compactor to facilitate rapid raising and lowering of the basket. In particular, the compactor and upper portion are mounted together between the pivot and a pair of extension members. Since the compactor and the upper portion share the pivot, the compactor can be used to quickly raise the upper portion from the lowered trucking position to the raised operating/inter-field transport position through the extension members and support members, which can be folded or removed from the front of the compactor. That is, the support members allow the compactor to provide support for the extension members to push against the compactor to raise the upper portion. Once the upper portion is raised into operational/field transport position, it can be secured by quick latches that hold it in the operational position. Once latched in place, the compactor can be raised by the extension members into operational position and the support members can be pivoted up against the compactor or lower portion floor or removed.

As such, one embodiment of the invention includes a cotton picker basket having a first basket portion and a second basket portion, the first basket portion configured to move relative to the second basket portion to adjust a volume contained therein and an compactor disposed at least in part within one of the first basket portion and the second basket portion. The cotton picker basket also includes an actuator configured to adjust a position of the compactor within one of the first basket portion and the second basket portion and to move the first basket portion relative to the second basket portion to adjust the volume contained therebetween.

Another embodiment of the invention includes a cotton picker basket having a lower basket portion having a first volume therein and an upper basket portion having a second volume therein. The cotton picker basket also includes a pivot at least partially supporting at least one of the lower basket portion and the upper basket portion to allow pivotal motion of at least one of the lower basket portion and the upper basket portion between an extended travel position where the first volume and the second volume occupy a common volume and a harvesting position where the first volume is substantially disjunctive from the second volume and an actuator disposed at least in part in at least one of the lower basket portion and the upper basket portion and configured to move at least one of the lower basket portion and the upper basket portion between the extended travel position and the harvesting position.

A further embodiment of the invention includes a method of manufacturing a cotton picker basket. The method includes positioning a lower basket portion below an upper basket portion, each of the upper basket portion and lower basket portion having a volume for receiving cotton therein and connecting the upper basket portion through a pivot to the lower basket portion to allow the upper basket portion to move between a raised position and a lowered position. The method also includes supporting a first end of a compactor within at least one of the volumes on a pivot to allow pivotal motion of the compactor between a lowered position and a raised position and connecting at least one actuator between the upper basket portion and the compactor to move the upper basket portion between the lowered position and the raised position and to move the compactor between the lowered position and the raised position.

The present invention has been described in terms of the preferred embodiment, and it should be appreciated that many equivalents, alternatives, variations, and modifications, aside from those expressly stated, are possible and within the scope of the invention. Therefore, the invention should not be limited to a particular described embodiment.

We claim:

1. A cotton picker basket comprising:
a first basket portion and a second basket portion, the first basket portion configured to move relative to the second basket portion to adjust a volume contained therein;
a compactor disposed at least in part within one of the first basket portion and the second basket portion;
an actuator configured to adjust a position of the compactor within one of the first basket portion and the second basket portion and to move the first basket portion relative to the second basket portion to adjust the volume contained therebetween,wherein the actuator is at least in part supported by a stand configured to engage a base of the lower basket portion to support the actuator when moving the upper basket portion between the extended travel position and the harvesting position; and
a pivot configured to support a first end of the compactor and a first end of the first basket portion to permit pivotal motion of the first basket relative to the second basket and pivotal motion of the compactor within at least one of the first basket portion and the second basket portion.

2. The basket of claim 1 wherein the first basket portion includes an entry portal at a second end of the first basket portion and wherein the entry portal is configured to receive cotton entering the basket.

3. The basket of claim 1 wherein the actuator is configured to move the first basket portion between a raised position for harvesting operations and inter-field travel and a lowered position for extended transportation.

4. The basket of claim 3 further comprising a stop configured to support the first basket portion against the second basket portion when in the lowered position.

5. The basket of claim 3 further comprising a hood configured to cover at least a portion of the first basket portion when in the lowered position.

6. The basket of claim 3 further comprising a latch assembly configured to support the first basket portion when in the raised position.

7. The basket of claim 1 further comprising at least one support member extending from the compactor to the second basket portion to support one end of the compactor thereagainst.

8. The basket of claim 7 wherein the compactor is configured to pivot between a lowered position to engage the at least one support member against the second basket portion and a raised position near the first basket portion when the first basket portion is in the raised position.

9. The basket of claim 8 wherein the at least one support member is configured to be arranged in it harvesting position when the compactor is in the raised position within the first basket portion.

10. A cotton picker basket comprising:
a lower basket portion having a first volume therein;
an upper basket portion having a second volume therein;
a pivot at least partially supporting the upper basket portion to allow pivotal motion of the upper basket portion between an extended travel position where the first volume and the second volume occupy a common volume and a harvesting position where the first volume is substantially disjunctive from the second volume;
an actuator disposed at least in part in at least one or the lower basket portion and the upper basket portion and configured to move the upper basket portion between the extended travel position and the harvesting position, wherein the actuator is at least in part supported by a stand configured to engage a base of the lower basket portion to support the actuator when moving the upper basket portion between the extended travel position and the harvesting position; and
a compactor to compact cotton entering the upper basket, wherein the compactor is at least in part supported by the pivot to allow pivotal motion of the compactor between an extended travel position and a harvesting position.

11. The basket of claim 10 the actuator is at least in part supported by the compactor to move the upper basket portion between the extended travel position and the harvesting position.

12. The basket of claim 10 further comprising a hood rotatably mounted to the upper basket portion to move between a stowed position extending over at least a portion of the upper basket portion when in the extended travel position and an operational position extending from the upper basket portion when in the harvesting position to receive cotton deliver to the basket.

* * * * *